April 17, 1934.  M. H. DAMERELL  1,954,920
MACHINE FOR CENTERING AND MARKING CRANK SHAFT FORGINGS
Filed May 11, 1931   7 Sheets-Sheet 1
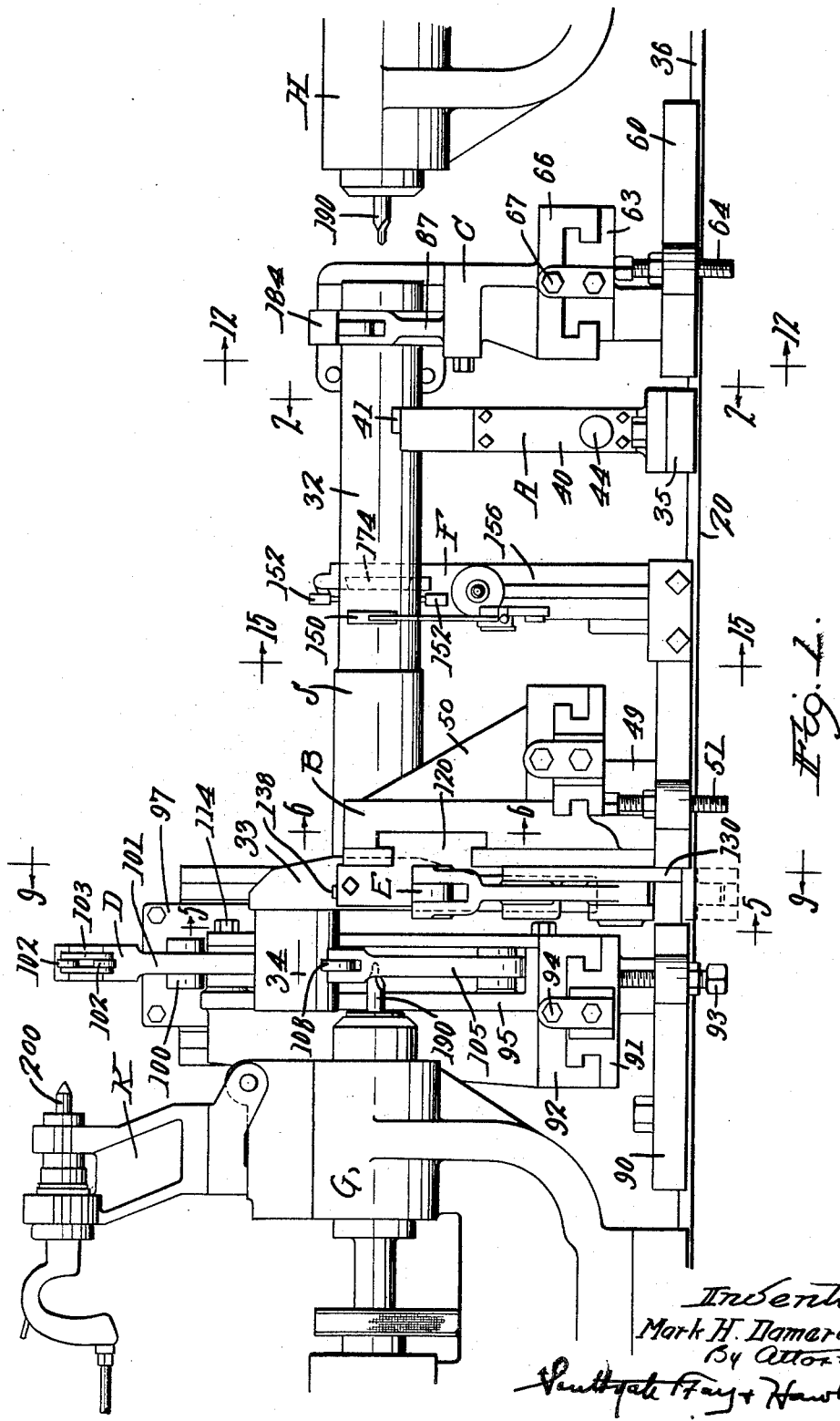

April 17, 1934.    M. H. DAMERELL    1,954,920
MACHINE FOR CENTERING AND MARKING CRANK SHAFT FORGINGS
Filed May 11, 1931    7 Sheets-Sheet 2
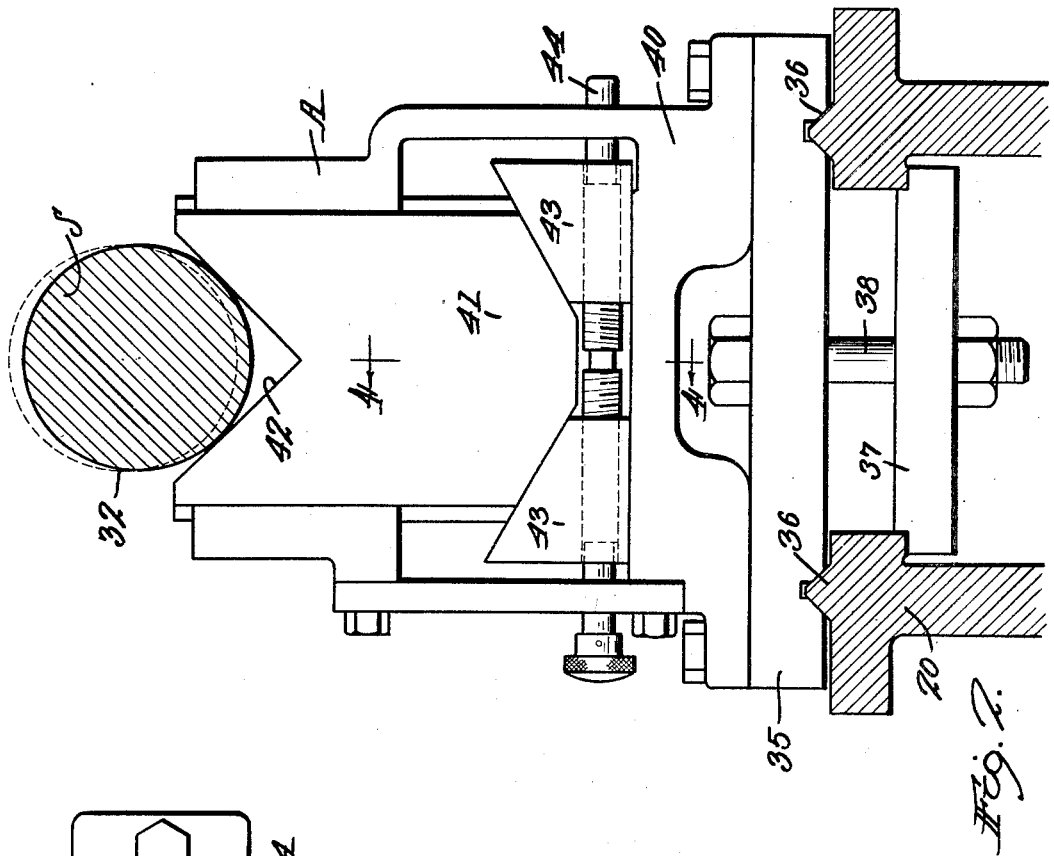
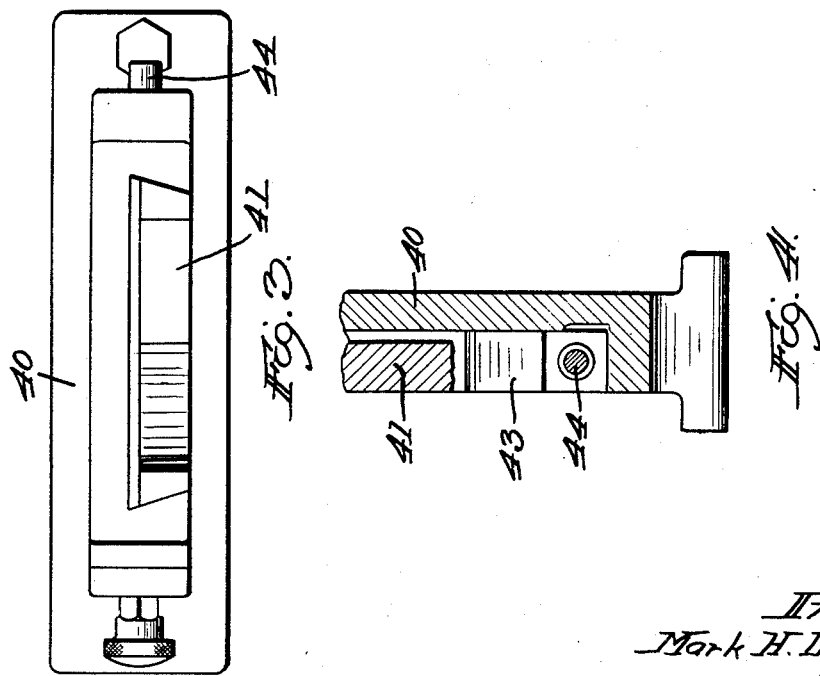
Inventor
Mark H. Damerell
By Attorneys
Southgate Fay & Hawley

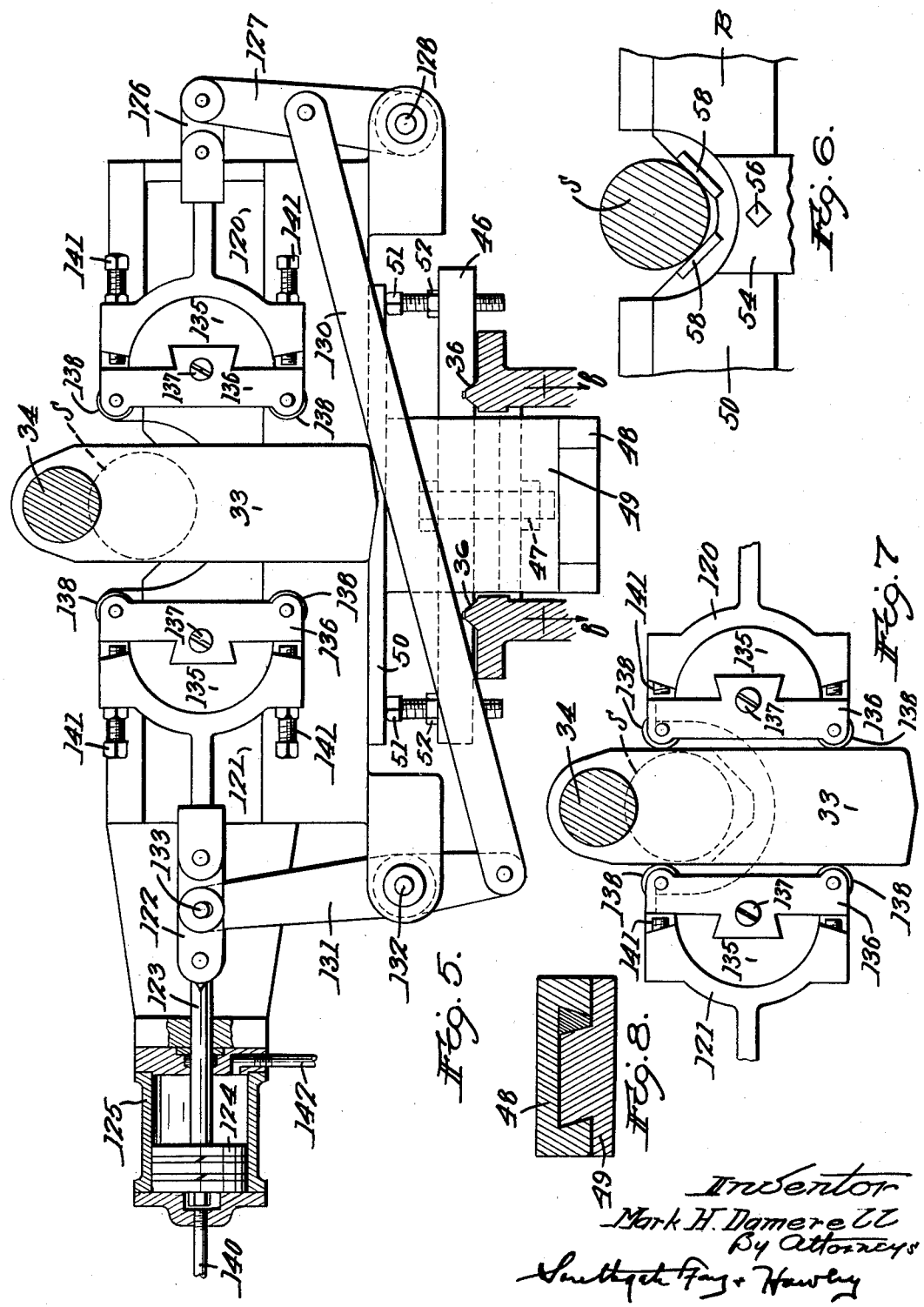

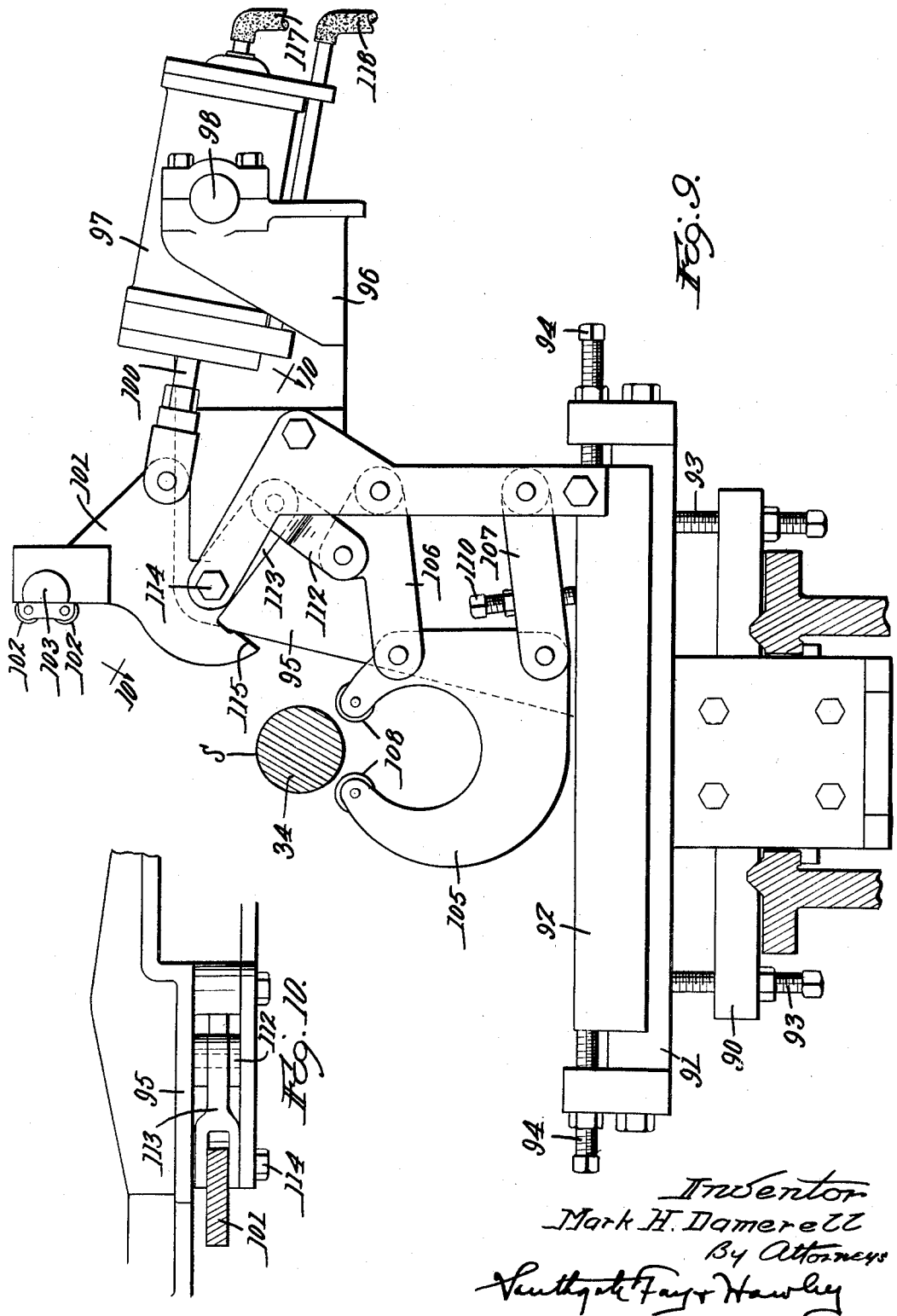

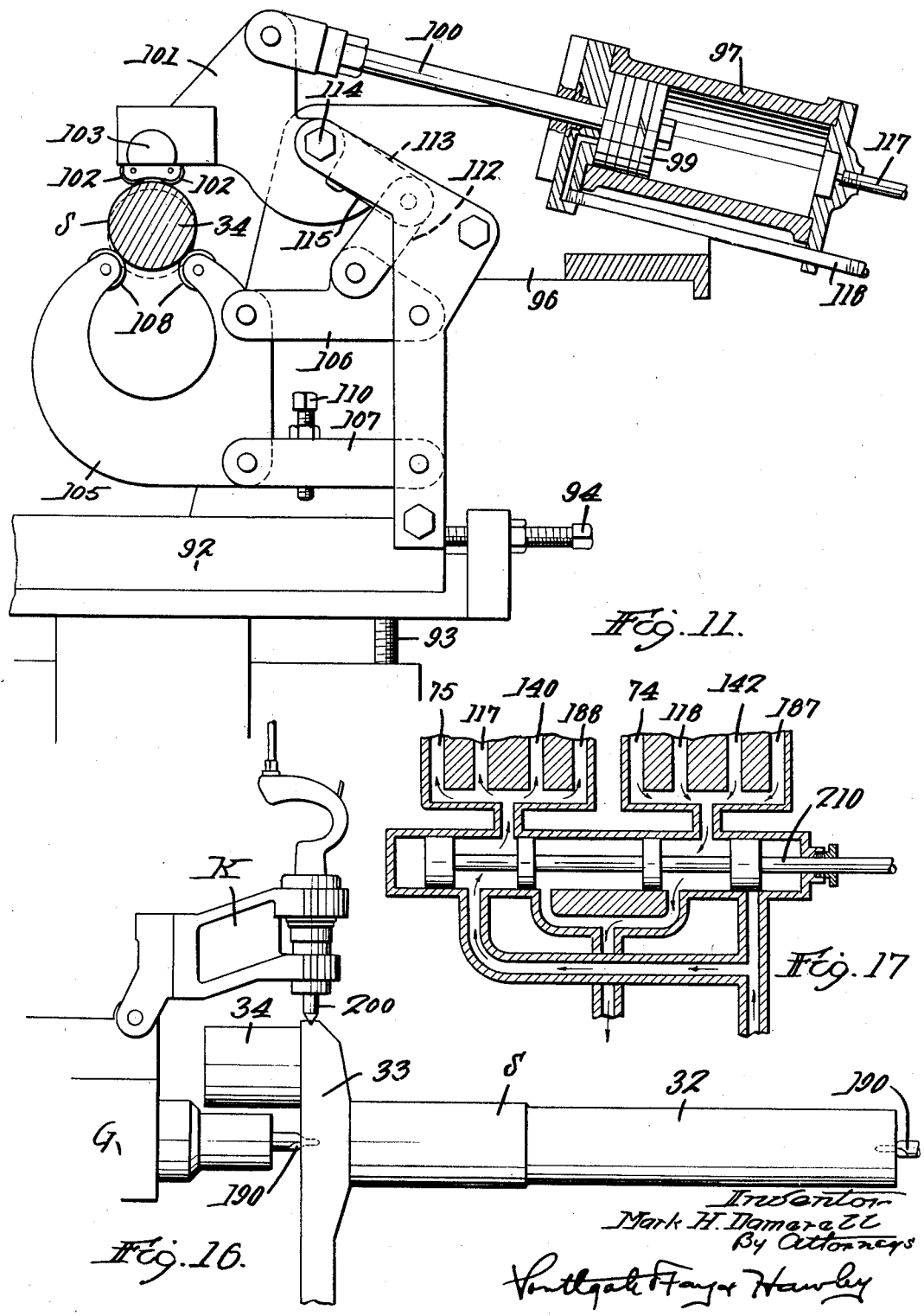

April 17, 1934.  M. H. DAMERELL  1,954,920
MACHINE FOR CENTERING AND MARKING CRANK SHAFT FORGINGS
Filed May 11, 1931  7 Sheets-Sheet 6

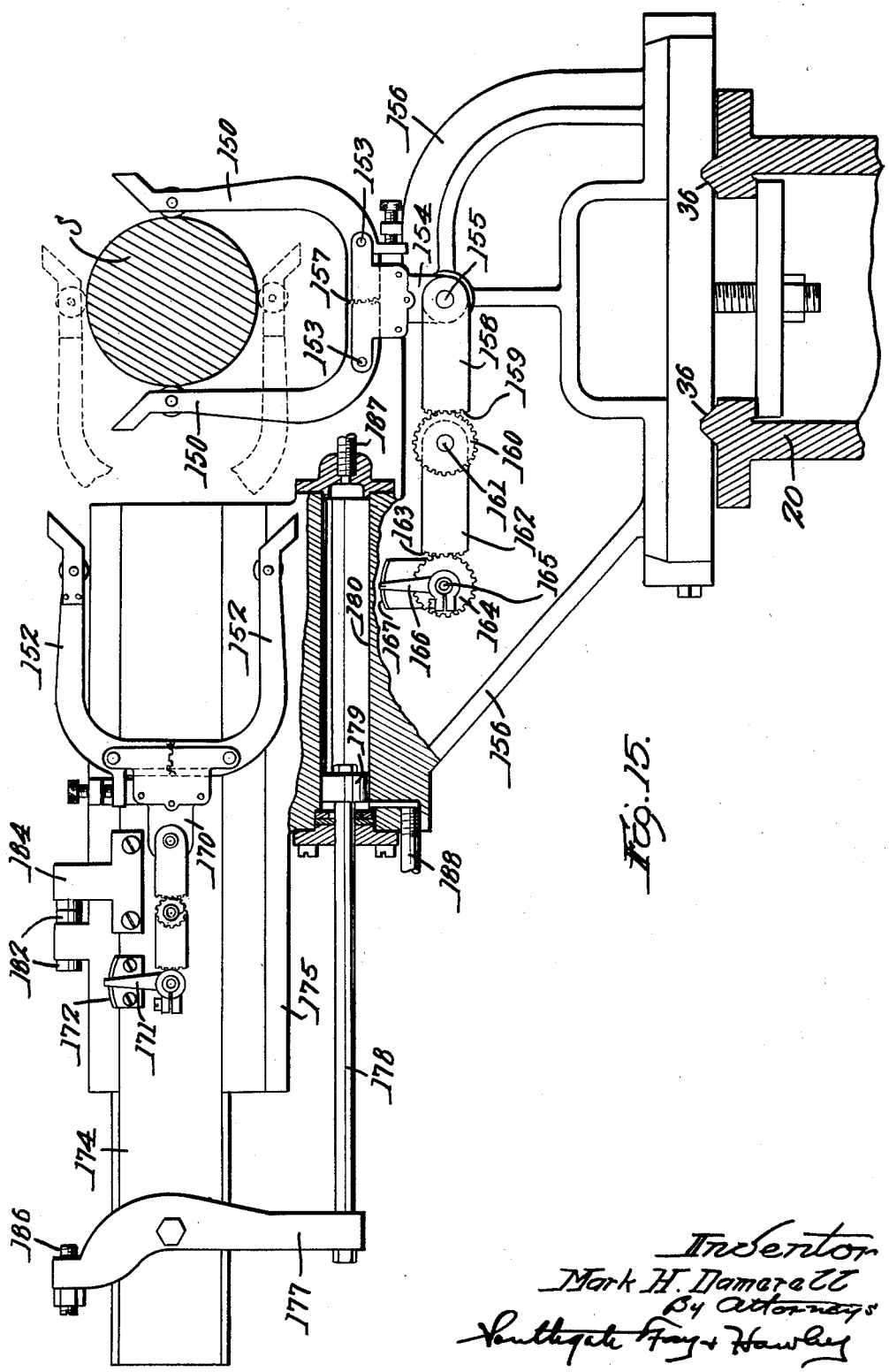

Patented Apr. 17, 1934

1,954,920

UNITED STATES PATENT OFFICE 1,954,920

MACHINE FOR CENTERING AND MARKING CRANK SHAFT FORGINGS

Mark H. Damerell, Worcester, Mass., assignor to Wyman-Gordon Company, Worcester, Mass., a corporation of Massachusetts Application May 11, 1931, Serial No. 536,345

7 Claims. (Cl. 77—18)

This invention relates to a machine for centering and marking crank-shaft forgings.

It is the general object of my invention to provide improved mechanism by which a crank-shaft forging may be centered with respect to a defined axis and may be center drilled while in such position.

A further object is to provide means by which a crank cheek may be located in a desired position and by which the cheek or other part of the forging may be index-marked for further operations.

I also provide mechanism for indicating errors in the alignment of the shaft at an intermediate point in its length.

An important feature of my invention relates to certain constructions by which insertion or removal of a crank-shaft forging in the machine is facilitated.

My invention further relates to arrangements and combinations of parts which will be hereinafter described and more particularly pointed out in the appended claims.

A preferred form of the invention is shown in the drawings, in which

Fig. 1 is a partial front elevation of my improved machine;

Fig. 2 is a sectional side elevation, showing an adjustable support and taken along the line 2—2 in Fig. 1;

Fig. 3 is a plan view of the support shown in Fig. 2;

Fig. 4 is a sectional elevation of certain parts, taken along the line 4—4 in Fig. 2;

Fig. 5 is a side elevation, partly in section, and showing devices for angularly positioning the crank-cheek, taken along the line 5—5 in Fig. 1;

Fig. 6 is a detail sectional view of a support for the crank-shaft forging, taken along the line 6—6 in Fig. 1;

Fig. 7 shows certain of the parts which appear in Fig. 5, but in a different position;

Fig. 8 is a detail sectional plan view, taken along the line 8—8 in Fig. 5;

Fig. 9 is a sectional side elevation, taken along the line 9—9 in Fig. 1, and showing centering and clamping mechanism for the crank-shaft bearing portion;

Fig. 10 is a detail sectional view, taken along the line 10—10 in Fig. 9;

Fig. 11 is a view similar to Fig. 9 but partly in section and showing the parts in a different operative relation;

Fig. 15 is a sectional side elevation of certain indicating mechanism, taken along the line 15—15 in Fig. 1;

Fig. 16 is a detail front elevation showing a marking device in operative position, and Fig. 17 is a detail sectional view of certain valve mechanism to be described.

Figure 12:
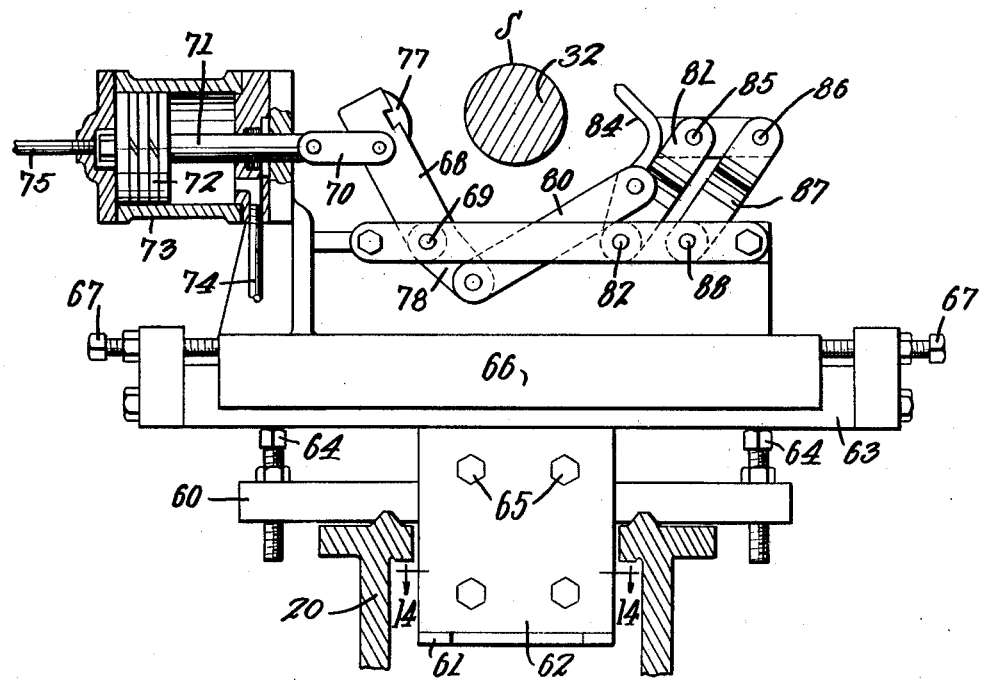
Fig. 12 is a sectional side elevation of centering and clamping mechanism for the crank-pin, taken along the line 12—12 in Fig. 1.

Referring to Fig. 1, I have shown my improved centering and marking machine as comprising a base or bed 20 on which a plurality of operative units are mounted, each unit being slidable lengthwise of the base or bed 20, and provision being made for securing each unit in a selected longitudinal position.

Briefly described, I have provided a rest or supporting device A, a second rest or supporting device B, a centering and clamping mechanism C, a second centering and clamping mechanism D, a crank-cheek locating mechanism E, an indicating mechanism F, center-drilling heads G and H, and a marking device K.

The crank-shaft forging S shown in the drawings is of a type used in the production of crank-shafts for airplane engines and comprises a bearing portion 32 (Fig. 16), a counterbalanced cheek 33 and a crank-pin 34.

In the operation of the machine, the crank-shaft forging is inserted in the machine by vertical downward movement and is initially supported on the rests or supporting devices A and B.

Supporting Devices A and B

The supporting device A is shown in detail in Figs. 2 to 4 and comprises a base 35 slidable on guideways 36 on the bed 20 and adapted to be secured in adjusted position thereon by a clamping bar 37 and clamping bolt 38. The base 35 supports a frame 40 having vertical dove-tailed guideways for a slide 41, which has a V-shaped recess 42 at its upper end to receive the bearing portion 32 of the crank-shaft forging S.

The lower end of the slide 41 is bevelled to engage wedges 43 which are threaded on a right and left hand adjusting screw 44. By turning the screw 44, the wedges 43 may be moved toward or away from each other to raise or lower the slide 41.

The support B comprises a base 46 (Fig. 5) longitudinally adjustable on the guideways 36 previously described and adapted to be secured thereto by a clamping bolt 47. The base 46 has a depending dove-tailed portion 48 adapted to receive a downwardly extending portion 49 of a frame member 50. The frame member 50 is laterally extended, as shown in Fig. 5, and may be vertically positioned by adjusting screws 51, threaded in the base 46 and provided with lock nuts 52.

A slide 54 (Fig. 6) is mounted in the frame member 50 and may be secured in vertically adjusted position therein by a clamping screw 56. At its upper end, the slide 54 is provided with wear plates 58 on which the crank-pin end of the forging S is supported in initial inserted position.

*Centering and clamping mechanisms C and D*

Figure 14:
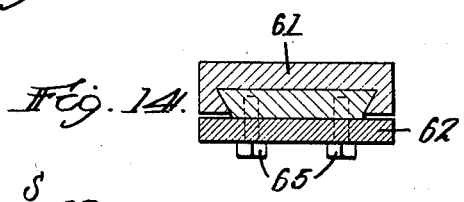
Fig. 14 is a detail sectional view, taken along the line 14—14 in Fig. 12.

Mechanisms C and D are provided for centering and clamping the crank-shaft in desired axial position. The centering and clamping mechanism C is shown in detail in Figs. 12 to 14, and comprises a base 60 slidable on the bed 20 and adapted to be secured in a selected longitudinal position thereon.

The base 60 is provided with a depending dove-tailed guiding portion 61, adapted to receive a dove-tailed downward projection 62 of a frame member 63. The frame member 63 may be adjusted vertically by screws 64 and may be secured in adjusted position by clamping screws 65.

A cross slide 66 (Fig. 12) is mounted on guideways on the frame member 63 and may be positioned horizontally by adjusting screws 67. A lever 68 is pivoted at 69 on the slide 66 and is connected by a link 70 to a piston rod 71, secured to a piston 72 slidable in a cylinder or casing 73. Pipes 74 and 75 are connected to admit air to either end of the cylinder 73 as desired. The lever 68 is provided with a face plate 77 adapted to engage one side of the forging S.

A depending portion 78 of the lever 68 is connected by a link 80 to an arm 81, pivoted at 82 on the slide 66. A V-shaped contact member 84 is pivoted at 85 to the upper end of the arm 81 and is also pivoted at 86 to the upper end of an arm 87, which in turn is pivoted at 88 to the slide 66. The arms 81 and 87 constitute a parallel link mechanism by which the contact member 84 is advanced without angular movement toward the forging S.

Figure 13:
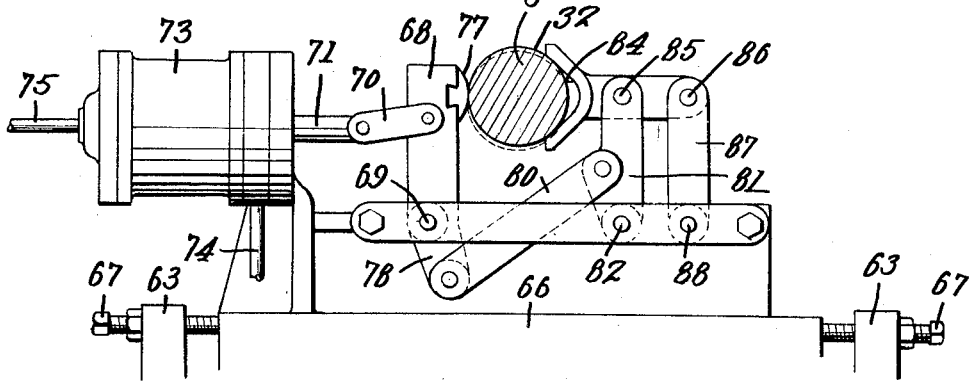
Fig. 13 is a side elevation showing certain parts which appear in Fig. 12 but in a different position.

When air is admitted to the pipe 75 to move the piston 72 toward the right in Figs. 12 and 13, the contact members 77 and 84 are advanced proportionately from opposite sides toward the predetermined axis of the machine and engage the forging S with a three-point contact, as clearly shown in Fig. 13, such engagement lifting the portion 32 of the forging S free from the rest or supporting device A, as shown in dotted lines in Fig. 2.

When air is admitted to the pipe 74, the contact members are withdrawn to the idle position indicated in Fig. 12, permitting free and easy removal and replacement of the work.

The centering and clamping mechanism D engages the crank-pin 34 and is shown in detail in Figs. 9, 10 and 11, comprising a base 90, frame member 91, cross slide 92 and adjusting screws 93 and 94, all substantially as described for the clamping mechanism C.

The slide 92 is provided with an upright frame bracket or standard 95 having a lateral projection 96 on which a cylinder 97 is pivoted at 98. A piston 99 (Fig. 11) in the cylinder 97 is connected by a piston rod 100 to a clamping lever 101 having rolls 102 mounted in a swivel carriage 103 and adapted to engage the crank-pin 34 of the forging S at spaced points when moved to operative position.

A second clamping member 105 (Fig. 9) is mounted on parallel links 106 and 107 and is provided with spaced contact rolls 108. An adjustable stop screw 110 in the link 107 engages the slide 92 and determines the downward inoperative position of the clamping member 105.

The upper parallel link 106 is connected by a link 112 to an arm 113 (Fig. 10) pivoted on a stud 114 in the standard 95. The clamping member 101 is also pivoted on the stud 114 and is provided with a lug or projection 115, adapted to engage the lower side of the arm 113 as the clamping member 101 approaches contact position.

Such engagement causes the arm 113 to move upward and acts through the link 112 and parallel links 106 and 107 to raise the clamping member 105 against the lower side of the crank-pin 34 and forging S. The crank-pin 34 is thus simultaneously engaged at two upper and two lower contact points and is raised from the dotted line initial position of Fig. 11 to the full line position indicated therein.

Advance movement of the contact members to operative position is caused by admitting air through a pipe 117 at the right hand end of the cylinder 97, as viewed in Fig. 11, and movement of the parts to the inoperative position shown in Fig. 9 is caused by admission of air through the pipe 118 to the left hand end of the cylinder 97.

It should be particularly noted that when the parts are in inoperative position, the clamping member 101 is swung backward so as to permit free removal or replacement of the work.

*Cheek-positioning mechanism E*

The mechanism for vertically aligning the cheek 33 of the crank-shaft forging S is shown in detail in Figs. 5 and 7 and comprises slides 120 (Fig. 1) and 121 (Fig. 5) mounted in horizontal dove-tailed guideways in the frame member 50 previously described.

The slide 121 is connected by a link 122 to a piston rod 123, secured to a piston 124 slidable in a cylinder 125. The slide 120 is similarly connected by a link 126 to a lever 127, pivoted at 128 on the frame member 50. The lever 127 is connected by a link 130 to the lower end of a lever 131, pivoted at 132 on the frame member 50 and also having a pin and slot connection at 133 to the link 122.

Swivel plates 135 are mounted in bearings in the slides 120 and 121 and are provided with contact plates 136 secured thereto by screws 137 and provided with spaced contact rolls 138.

When air is admitted through a pipe 140 at the outer end of the cylinder 125, the contact rolls 138 are simultaneously advanced to engage the opposite sides of the cheek 33 as shown in Fig. 7. The swivel mounting of the plates 135 permit an equalizing movement of the rolls, so that all four of the rolls 138 may firmly engage the cheek 33. It will be noted that the upper roll 138 on each slide is above the axis of the forging S and the other roll 138 is substantially below the axis, the rolls thus acting to vertically align the cheek. Adjusting screws 141 are provided to limit the swivel movement of the plates 135.

By the simultaneous advance movement of the rolls 138 toward the axis or center line of the machine, the cheek 33 is vertically positioned and the axes of the crank shaft and crank pin are thus vertically aligned. Admission of air to a second pipe 142 at the inner end of the cylinder 125 moves the parts to the separated or idle position shown in Fig. 5.

Indicating mechanism F

I have provided indicating mechanism F to determine the alignment of the forging S with the axis of the machine at a point substantially midway between the ends of the forging. This indicating mechanism is shown in detail in Fig. 15 and comprises a pair of indicating arms 150 for determining the horizontal alignment, and a second pair of indicating arms 152 for determining the vertical alignment.

The arms 150 are pivoted at 153 on a support 154, pivoted to rock about a stud 155 carried by a fixed base or support 156 longitudinally adjustable on the bed 20. Each arm is provided with segmental teeth 157, closely meshing with each other and thus insuring equal and simultaneous inward and outward movements of the contact points of the arms 150.

A laterally projecting arm 158 is secured to the rocking support 154 and is provided with segmental teeth 159, engaging a pinion 160 mounted on a fixed pivot 161. An arm 162 is secured to the pinion 160 and is provided with segmental teeth 163, engaging a pinion 164 mounted on a fixed pivot 165 and having an index arm 166 located adjacent a graduated scale 167.

When the arms 150 are equally spaced from the center line of the machine, the index arm 166 will indicate zero on the scale 167, but if the arms 150 are displaced laterally in either direction, this will cause a rocking movement of the support 154 and a corresponding and much magnified movement of the index arm 166.

The indicating arms 152 are similarly constructed, being pivoted on a rocking support 170 and being connected to each other by intermeshing segmental teeth as previously described. The rocking support 170 is connected through equivalent multiplying connections to an index arm 171 mounted to move over a graduated scale 172.

The indicating arms 152 and associated parts are all mounted on and supported by a slide bar 174, mounted in horizontal guideways in a laterally projecting portion 175 of the fixed frame member 156. A cross arm 177 is secured to the slide bar 174 and is connected by a piston rod 178 to a piston 179 in a cylinder 180.

A stud 182 is fixed to the portion 175 of the frame member 156 and constitutes a stop for the slide bar 174 in both directions. When the slide bar moves outward to inoperative position, a bracket 184 on the slide bar engages the right hand end of the stud 182, as shown in Fig. 15, and when the slide bar moves to operative position, and adjustable stop screw 186 in the upper end of the cross bar 177 engages the left hand end of the stud 182.

Movement of the slide bar 174 to inoperative position is effected by admitting air through a pipe 187 to the right hand end of the cylinder 180, and movement of the slide bar and associated parts to operative position is effected by admitting air through a pipe 188 to the left hand end of the cylinder 180.

When the slide bar 174 is withdrawn, it will be noted that the indicating arms 152 are withdrawn from the work to such an extent that free vertical removal and replacement of the work is permitted.

Center drilling and marking devices G, H and K

After the work has been positioned and indicated by the mechanisms previously described, it is then ready to be center drilled and index-marked. For this purpose I provide drilling heads G and H (Fig. 1) in each of which a center drill 190 is supported. After the forging S is centered and indicated and found to be satisfactorily positioned, the drills 190 are simultaneously advanced to drill center holes of predetermined depths in the forging S.

The details of this center boring mechanism form no part of my present invention and for a complete description of mechanism adapted for this purpose, reference is made to my prior Patent No. 1,766,812, issued June 24, 1930.

It is desirable to preserve a record of the alignment of the cheek 33 and the angular position of the crank-pin 34 at the time when the center holes are drilled, so that the forging may be placed in a corresponding position in other machines for further operations.

For this purpose I provide marking mechanism K, shown herein as comprising a pneumatic hammer having a prick-punch or marking point 200 operatively mounted therein. The mechanism K is normally supported in the withdrawn and inoperative position shown in Fig. 1, but may be manually swung downward to the position indicated in Fig. 16 for marking the end of the cheek 33, at the time when the crankshaft is located and the center holes are drilled.

General operation

The several pneumatic operating cylinders are preferably connected to a single source of air supply and controlled by a single valve 210 (Fig. 17) by which air will be simultaneously admitted through the pipes 75, 117, 140 and 188 to advance all of the centering, clamping and indicating devices to operative position.

In its reverse position, the control valve 210 will admit air simultaneously to the pipes 74, 118, 142 and 187 to withdraw the several parts to inoperative position. The center drilling devices G and H, and the pneumatic marking device K are separately controlled.

Attention is particularly called to the fact that all parts of the machine are so positioned when inoperative that vertical removal and replacement of the work is entirely unobstructed. This is extremely important in this type of machine, as the forgings are of substantial weight and the various mechanisms would be easily injured, if they were not substantially withdrawn from operative position before the work is changed.

Having thus described my invention and the advantages thereof, I do not wish to be limited to the details herein disclosed, otherwise than as set forth in the claims, but what I claim is:

1. A machine for centering and marking a forging having a shaft portion, a cheek projecting laterally from one end thereof and a crank-pin at the outer end of said cheek and on the opposite side thereof from said shaft portion, said machine comprising means to directly engage and separately center one end of said shaft portion, means to directly engage and separately center said crank-pin on an axis parallel to but substantially out of alignment with said shaft portion, and means to directly engage and position said crank cheek in parallel relation to the plane of the parallel axes of said shaft portion and crank-pin, said cheek-locating means comprising a pair of slides, spaced contact elements thereon, and means to move said slides simultaneously and equally toward and from the opposite side edges of said cheek.

2. A machine for centering and marking a forging having a shaft portion, a cheek projecting laterally from one end thereof and a crank-pin at the outer end of said cheek and on the opposite side thereof from said shaft portion, said machine comprising means to directly engage and separately center one end of said shaft portion, means to directly engage and separately center said crank-pin on an axis parallel to but substantially out of alignment with said shaft portion, and means to directly engage and position said crank cheek in parallel relation to the plane of the parallel axes of said shaft portion and crank-pin, said cheek-locating means comprising a pair of slides, spaced contact elements thereon, and means to move said slides simultaneously and equally toward and from the opposite side edges of said cheek, one contact element on each slide being above the axis of the shaft and one below said axis.

3. In a crank-shaft centering and marking machine, a centering and clamping mechanism comprising upper and lower clamping members, means to guide said lower member in a substantially straight-line movement to engage the work, said lower member having spaced two-point centering engagement with the work, and means to substantially simultaneously swing said upper member inward and downward about a fixed axis to engage the work, said latter means including a pneumatic cylinder having a pivotal mounting and a piston in said cylinder having a piston rod pivotally connected to said swinging upper member, said upper member being withdrawn from above the work when in inoperative position and said lower member remaining in substantially vertical alignment with the work when in inoperative position, and said upper member actuating said lower member during its final downward movement.

4. In a crankshaft centering and marking machine, a centering and clamping mechanism comprising a lower clamping member having a pair of spaced contact elements, means to support said lower member at all times substantially aligned vertically with the centering axis of said clamping mechanism, an upper clamping member mounted to swing about a fixed pivot and normally withdrawn to one side of said centering axis and away from the space above the work, means to swing said upper member inward and downward through approximately ninety degrees to engage the upper side of the work, and means to move said lower member vertically upward during the latter part only of said swinging movement, thereby causing said upper and lower clamping members to engage the work substantially simultaneously.

5. In a crankshaft centering and marking machine, a centering and clamping mechanism comprising a lower clamping member having a pair of spaced contact elements, means to support said lower member at all times substantially aligned vertically with the centering axis of said clamping mechanism, an upper clamping member mounted to swing about a fixed pivot and normally withdrawn to one side of said centering axis and away from the space above the work, means to swing said upper member inward and downward through approximately ninety degrees to engage the upper side of the work, an actuating connection for said lower clamping member, a part of said actuating connections being located in the path of movement of a portion of said upper clamping member and being engaged thereby as said upper clamping member approaches work-engaging position and said lower clamping member being thereby moved upward to operative position.

6. In a crankshaft centering and marking machine, a centering and clamping mechanism comprising a lower clamping member having a pair of spaced contact elements, means to support said lower member at all times substantially aligned vertically with the centering axis of said clamping mechanism, an upper clamping member mounted to swing about a fixed pivot and normally withdrawn to one side of said centering axis and away from the space above the work, means to swing said upper member inward and downward through approximately ninety degrees to engage the upper side of the work, an actuating connection for said lower clamping member, a part of said actuating connections being located in the path of movement of a portion of said upper clamping member and being engaged thereby as said upper clamping member approaches work-engaging position and said lower clamping member being thereby moved upward to operative position, the final movement of said upper and lower clamping members being definitely proportional with respect to said centering axis.

7. In a crankshaft centering and marking machine, a centering and clamping mechanism comprising a lower clamping member having a pair of spaced contact elements, means to support said lower member at all times substantially aligned vertically with the centering axis of said clamping mechanism, an upper clamping member mounted to swing about a fixed pivot and normally withdrawn to one side of said centering axis and away from the space above the work, means to swing said upper member inward and downward through approximately ninety degrees to engage the upper side of the work, an actuating connection for said lower clamping member, a part of said actuating connections being located in the path of movement of a portion of said upper clamping member and being engaged thereby as said upper clamping member approaches work-engaging position and said lower clamping member being thereby moved upward to operative position, said upper clamping member closely approaching work-engaging position before movement of said lower clamping member begins and the final movements of said clamping members being substantially simultaneous and definitely proportional toward said centering axis.

MARK H. DAMERELL.